73-660
12/21/82  XR  4,364,275

United States Patent [19]
LaMar

[11] 4,364,275

[45] Dec. 21, 1982

[54] METHOD AND APPARATUS FOR MEASURING PHASE ANGLES OF OSCILLATORY MOTION OF VIBRATORY MACHINERY

[75] Inventor: Stephen R. LaMar, Santa Clara, Calif.

[73] Assignee: Sweco, Incorporated, Los Angeles, Calif.

[21] Appl. No.: 228,210

[22] Filed: Jan. 26, 1981

[51] Int. Cl.³ .................. G01N 29/00; G01H 11/00; G01M 13/00; B01F 15/00
[52] U.S. Cl. .................................... 73/649; 209/332; 73/660; 73/672; 73/667; 366/142
[58] Field of Search .............. 73/649, 660, 672, 657, 73/658, 663, 667, 668, 650, 653; 209/332; 198/770, 757; 366/142

[56] References Cited

U.S. PATENT DOCUMENTS

| 1,673,949 | 6/1928 | Rathbone | 73/649 X |
| 2,157,445 | 5/1939 | Wichart | 73/660 X |
| 3,220,546 | 11/1965 | Gardner | 209/332 |

FOREIGN PATENT DOCUMENTS 618321  8/1978  U.S.S.R. ........................ 73/649

Primary Examiner—Edward R. Kazenske
Assistant Examiner—David V. Carlson
Attorney, Agent, or Firm—Lyon & Lyon

[57] ABSTRACT

A method of determining the phase angle of a vibrating mechanism using line segments of selected angles. The motion of the line segments on the vibration mechanism is observed and the phase angle of the vibratory mechanism is determined using information from the observation.

1 Claim, 3 Drawing Figures

METHOD AND APPARATUS FOR MEASURING PHASE ANGLES OF OSCILLATORY MOTION OF VIBRATORY MACHINERY

BACKGROUND OF THE INVENTION

This invention relates to the measurement of motion of vibratory equipment.

Vibration inducing mechanisms have long been employed with resiliently mounted equipment designed for such uses as screening, milling, polishing, mixing and the like. To provide a versatile mechanism capable of a plurality of vibratory motions to accomplish varying tasks, systems have been devised employing a plurality of eccentric weights which can be adjusted relative to one another and driven by a common motor. One most common such arrangement includes a motor mounted to the resiliently mounted mechanism and having the shaft of the motor support an eccentric weight on each end thereof. The weights may be varied in magnitude of imbalance and also arranged at any lead angle with respect to one another. These mechanisms produce a three-dimensional elliptical motion which can be described by three independent parameters, these parameters being two orthogonal displacements and a phase angle.

It has been found in the past that amplitude measurements can be made by direct observation of the motion of the vibrating equipment. Such direct observations have been made easier by the use of two appropriately arranged line segments such that they diverge at a given angle positioned on the vibrating machinery. When viewed during vibration of the equipment, the lines will appear to intersect and the point of their intersection determines the amplitude of vibration in the direction roughly perpendicular to the lines. However, the two independent amplitude measurements are insufficient to completely describe the three degrees of freedom of elliptical motion. The phase angle of the elliptical vibration helps determine the motion defined by the material being processed in the vibratory equipment. Such amplitude measurement devices do not indicate this phase angle.

SUMMARY OF THE INVENTION

The present invention is directed to both a method and apparatus for the measurement of the phase angle of the elliptical motion of a conventional vibratory mechanism. By the present invention, a pattern of line segments are positioned on the vibratory equipment such that they lie on a plane perpendicular to the shaft driving the eccentric weights. The line segments are arranged at pre-selected angles for convenient observation of the vibratory path of the equipment. The line segments are also positioned on the vibratory equipment such that the angles are measured from a zero angle which is perpendicular to a line extending from the apex of the angles to the axis of the shaft on which the eccentric weights are mounted.

The arrangement of line segments is employed by first viewing the line segments from a substantially end-on perspective and noting the segment the end of which defines a substantially straight line. This line will be angled from the vertical. The ends of the remaining lines will define elliptical paths which become more and more circular the further they are away from the line segment appearing to define a line with the end thereof to the observer. The observer next looks at the set of line segments from a side view, rather than an end-on view, such that he is looking approximately along the line described by the end of the selected line segment. From this latter perspective, the line segments appear to be of varying thickness. The observer should then raise and lower his perspective slightly to ensure that the proper line segment has been selected. The thinnest appearing line segment is the appropriate one for the measurement.

Thus, it is an object of the present invention to provide a mechanism by which the phase angle of the elliptical motion of a vibratory mechanism may be conveniently measured without the need of special equipment other than the passive pattern of line segments.

It is a further object of the present invention to provide a method of measuring the phase angle of the elliptical motion of a vibratory mechanism during its operation.

Other and further objects and advantages will appear hereinafter.

DETAILED DESCRIPTION OF THE PREFERRED EMBODIMENTS

Figure 1:
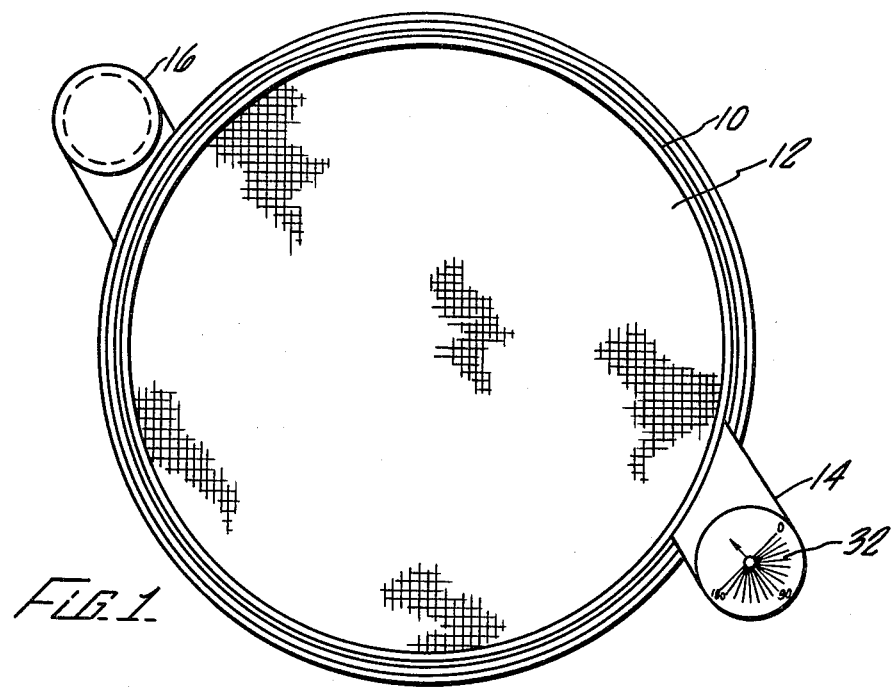
FIG. 1 is a plan view of a vibratory screen employing the present invention.
Figure 2:
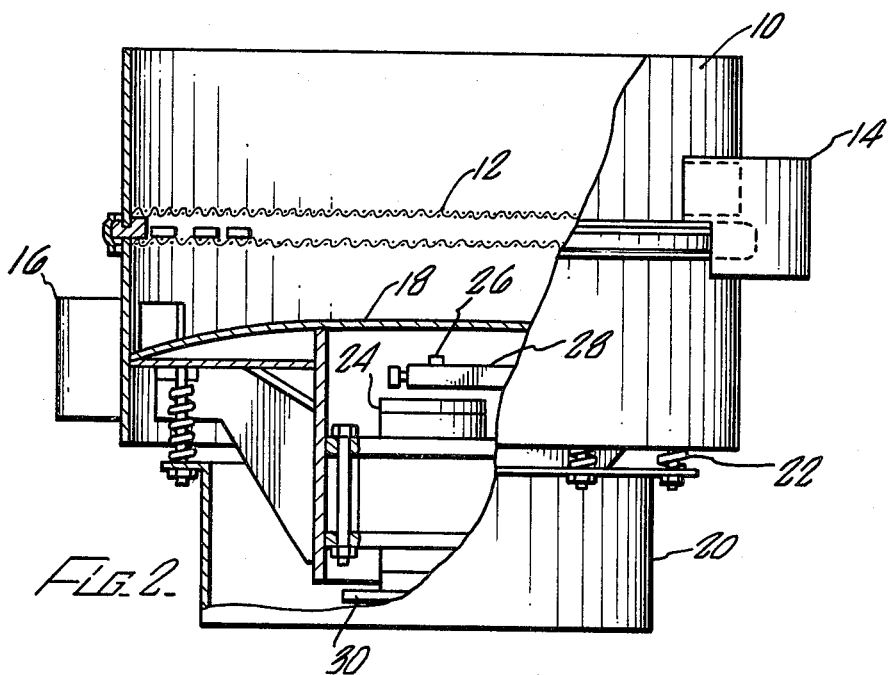
FIG. 2 is a side view partially broken away for illustration of the vibratory screen of FIG. 1.

Turning in detail to the drawings, the present invention is disclosed in the context of a vibratory screen mechanism.

The vibratory screen includes a cylindrical body 10 with a screen 12 mounted therein. Discharge spouts 14 and 16 provide for removal of the separated components from above the screen 12 and from a collector 18. The vibratory screen includes a base 20 upon which the cylindrical body 10 is resiliently mounted. The resilient mounting is provided by springs 22 fixed at a first end to the base 20 and at a second end to the cylindrical body 10.

Fixed securely to the cylindrical body 10, which is resiliently mounted on the base 20 to vibrate with the cylindrical body 10, is a motor 24. The motor 24 includes a vertical shaft 26 extending therethrough. Mounted to the vertical shaft 26 is an upper eccentric weight 28 and a lower eccentric weight 30. The upper and lower eccentric weights 28 and 30 may be adjusted relative to one another to provide different lead angles. When the motor 24 is energized, the weights induce vibratory motion of particular, predictable characteristics in the vibratory mechanism.

Located conveniently on the discharge spout 14 is an arrangement of line segments 32. The upper surface of the discharge spout 14 is substantially perpendicular to the axis of the motor shaft 26. Thus, the line segments lie on a plane which is also substantially perpendicular to the axis of the motor shaft 26.

Figure 3:
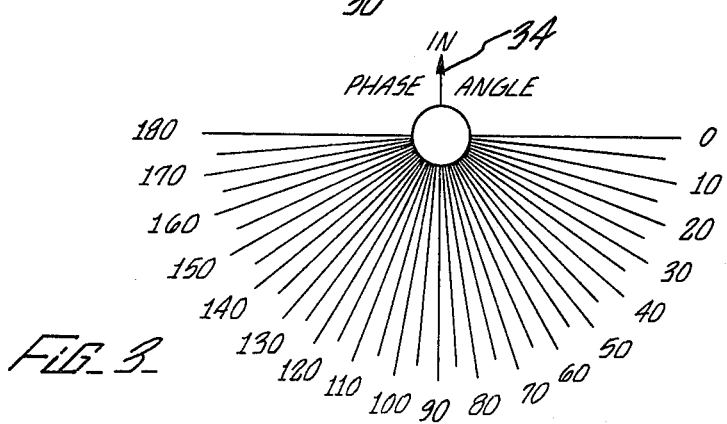
FIG. 3 is a detailed plan view of the mechanism of the present invention.

As can be seen from FIG. 3, the line segments are arranged in degrees from 0 to 180 and are in increments of five degrees and alternately numbered in ten degree increments. The lines are arranged with the arrow 34 pointed to the center of the device through which the axis of the shaft 26 passes. The angles are measured from a zero line which is perpendicular to that arrow 34 thus is perpendicular to a line between the apex or common point of the line segments and the axis of the shaft 26.

The arrangement of line segments 32 is employed for measuring the phase angle of the elliptical motion of the vibratory screen mechanism by observing the lines when the vibratory device is in motion. First, the observer views the line segments 32 from a substantially end-on view. He hunts around the lines from 0° to 180° for the line segment which has an endpoint that appears to move in a line. The remaining line segments will have endpoints which appear to move in ellipses which vary from extremely thin ellipses to substantially circular ellipses as one moves away from the line segment defining a path most approximating a straight line. The line so defined will be at an angle to the vertical direction or a direction parallel to the axis of the shaft 26. This angle is to be observed from the substantially end-on position. The observer next positions himself such that he has a side view of the line segments 32. The observer is to look across and slightly down upon the line segments at approximately the angle observed from the end on position. As the observer raises and lowers his perspective, he will confirm that one line segment defines a fine distinct line while all others form hazy, vibrating images. It is this line segment which indicates the true phase angle of the elliptical motion.

Thus, an indicator and an improved method of measuring the phase angle of elliptical motion of vibratory equipment is herein disclosed. While embodiments and applications of this invention have been shown and described, it would be apparent to those skilled in the art that many more modifications are possible without departing from the inventive concepts herein described. The invention, therefore, is not to be restrictive except by the spirit of the appended claim.

What is claimed is:

1. A method for the measurement of the phase angle of vibratory motion of a mechanism having spaced eccentric weights on a vertical shaft while the mechanism is running, comprising the steps of viewing line segments arranged in selected angles on a surface of the vibratory mechanism perpendicular to the vertical shaft from substantially an end-on position;

selecting the line segment the end of which appears to define a straight line from the substantially end-on position;

viewing the line segments from an upper side view aligned with the line defined by the selected line segment;

selecting the line segment appearing as having the thinnest cross-section as viewed from the upper side view.

* * * * *